United States Patent
Arimilli et al.

(10) Patent No.: US 6,343,344 B1
(45) Date of Patent: Jan. 29, 2002

(54) SYSTEM BUS DIRECTORY SNOOPING MECHANISM FOR READ/CASTOUT (RCO) ADDRESS TRANSACTION

(75) Inventors: Ravi Kumar Arimilli, Austin; John Steven Dodson, Pflugerville; Guy Lynn Guthrie; Jody B. Joyner, both of Austin; Jerry Don Lewis, Round Rock, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/368,221

(22) Filed: Aug. 4, 1999

(51) Int. Cl.$^7$ ................................................. G06F 12/08
(52) U.S. Cl. ........................ 711/128; 711/121; 711/122; 711/143
(58) Field of Search ................................. 711/128, 122, 711/121, 143, 144, 145, 146, 136

(56) References Cited

U.S. PATENT DOCUMENTS

| | | |
|---|---|---|
| 4,797,814 A | 1/1989 | Brenza |
| 5,369,753 A | 11/1994 | Tipley |
| 5,493,668 A | 2/1996 | Elko et al. |
| 5,564,035 A | 10/1996 | Lai |
| 5,636,355 A * | 6/1997 | Ramakrishnan et al. .... 711/113 |
| 5,829,038 A | 10/1998 | Merrell et al. |
| 5,829,040 A | 10/1998 | Son |
| 5,895,495 A | 4/1999 | Arimilli et al. |
| 5,946,709 A | 8/1999 | Arimilli et al. |
| 5,966,729 A | 10/1999 | Phelps |
| 6,018,791 A | 1/2000 | Arimilli et al. |
| 6,021,468 A | 2/2000 | Arimilli et al. |
| 6,023,747 A * | 2/2000 | Dodson ...................... 711/141 |
| 6,029,204 A | 2/2000 | Arimilli et al. |
| 6,058,456 A | 5/2000 | Arimilli et al. |
| 6,195,729 B1 | 2/2001 | Arimilli et al. |

OTHER PUBLICATIONS

Lebeck et al., Request combining in multiprocessors with arbitrary interconnection networks, IEEE digital library, vol. 5, No. 11, pp. 1140–1155, Nov. 1994.*
Texas Instruments Incorporated, TM532010 User's Guide, 1983, 3 pages.
Handy, Jim; *The Cache Memory Book*; Academic Press, Inc.; 1993; pp. 77–82.

* cited by examiner

*Primary Examiner*—Hiep T. Nguyen
(74) *Attorney, Agent, or Firm*—Casimer K. Salys; Bracewell & Patterson, L.L.P.

(57) ABSTRACT

In response to receiving a combined address for related data access and cast out operations, including an index identifying a congruence class containing both the target of the data access and the victim of the cast out, a single directory access is performed utilizing the index to locate the congruence class. Address tags within the congruence class are then compared to the address tag for the data access operation and the address tag for the cast out operation concurrently, generating separate hit signals as appropriate. Only a single directory access is required, however, rather than two separate directory accesses as required in the known art, taking advantage of the fact that both the data access target and the cast out victim belong to a single congruence class. Response latency is also improved, as is address bus bandwidth utilization.

17 Claims, 6 Drawing Sheets

SYSTEM BUS DIRECTORY SNOOPING MECHANISM FOR READ/CASTOUT (RCO) ADDRESS TRANSACTION

RELATED APPLICATIONS

The present invention is related to the subject matter of commonly assigned, copending U.S. patent applications: Ser. No. 09/368,222, entitled "MULTIPROCESSOR SYSTEM BUS WITH READ/CASTOUT (RCO) ADDRESS TRANSACTION"; Ser. No. 09/368,225, entitled "PRECISE INCLUSIVITY MECHANISM FOR SYSTEM BUS WITH READ/DEALLOCATED (RDA) ADDRESS TRANSACTION"; Ser. No. 09/368,224, entitled "MULTIPROCESSOR SYSTEM BUS WITH CACHE STATE AND LRU SNOOP RESPONSES FOR READ/CASTOUT (RCO) ADDRESS TRANSACTION"; Ser. No. 09/368,223, entitled "UPGRADING OF SNOOPER CACHE STATE MECHANISM FOR SYSTEM BUS WITH READ/CASTOUT (RCO) ADDRESS TRANSACTIONS"; Ser. No. 09/368,227 now U.S. Pat. No. 6,279,086 entitled "MULTIPROCESSOR SYSTEM BUS WITH COMBINED SNOOP RESPONSES IMPLICITLY UPDATING SNOOPER LRU POSITION"; Ser. No. 09/368,226 now U.S. Pat. No. 6,275,909 entitled "MULTIPROCESSOR SYSTEM BUS WITH SYSTEM CONTROLLER EXPLICITLY UPDATING SNOOPER CACHE STATE INFORMATION"; Ser. No. 09/368,229 entitled "MULTIPROCESSOR SYSTEM BUS WITH SYSTEM CONTROLLER EXPLICITLY UPDATING SNOOPER LRU INFORMATION"; Ser. No. 09/368,228 entitled "MULTIPROCESSOR SYSTEM BUS WITH COMBINED SNOOP RESPONSES EXPLICITLY CANCELLING MASTER VICTIM SYSTEM BUS TRANSACTION"; Ser. No. 09/368,230 entitled "MULTIPROCESSOR SYSTEM BUS WITH COMBINED SNOOP RESPONSES EXPLICITLY CANCELLING MASTER ALLOCATION OF READ DATA"; and Ser. No. 09/368,231 entitled "MULTIPROCESSOR SYSTEM BUS WITH COMBINED SNOOP RESPONSES EXPLICITLY INFORMING SNOOPERS TO SCARF DATA". The content of the above-identified applications is incorporated herein by reference.

BACKGROUND OF THE INVENTION

1. Technical Field

The present invention relates in general to directory accesses necessary for data access operations in data processing systems and in particular to directory lookups and tag comparisons for related data access and cast out operations. Still more particularly, the present invention relates to concurrent directory lookups and tag comparisons for related data access and cast out operations to improve storage device performance and response latency.

2. Description of the Related Art

High performance data processing systems typically include a number of levels of caching between the processor (s) and system memory to improve performance, reducing latency in data access operations. When utilized, multiple cache levels are typically employed in progressively larger sizes with a trade off to progressively longer access latencies. Smaller, faster caches are employed at levels within the storage hierarchy closer to the processor or processors, while larger, slower caches are employed at levels closer to system memory. Smaller amounts of data are maintained in upper cache levels, but may be accessed faster.

Within such systems, when data access operations frequently give rise to a need to make space for the subject data. For example, when retrieving data from lower storage levels such as system memory or lower level caches, a cache may need to overwrite other data already within the cache because no further unused space is available for the retrieved data. A replacement policy—typically a least-recently-used (LRU) replacement policy—is employed to decide which cache location(s) should be utilized to store the new data.

Often the cache location (commonly referred to as a "victim") to be overwritten contains only data which is invalid or otherwise unusable from the perspective of a memory coherency model being employed, or for which valid copies are concurrently stored in other devices within the system storage hierarchy. In such cases, the new data may be simply written to the cache location without regard to preserving the existing data at that location.

At other times, however, the cache location selected to received the new data contains modified data, or data which is otherwise unique or special within the storage hierarchy. In such instances, the replacement of data within a selected cache location (a process often referred to as "updating" the cache) requires that any modified data associated with the cache location selected by the replacement policy be written back to lower levels of the storage hierarchy for preservation. The process of writing modified data from a victim to system memory or a lower cache level is generally called a cast out or eviction.

When a cache initiates a data access operation—for instance, in response to a cache miss for a READ operation originating with a processor—typically the cache will initiate a data access operation (READ or WRITE) on a bus coupling the cache to lower storage levels. If the replacement policy requires that a modified cache line be overwritten, compelling a cast out for coherency purposes, the cache will also initiate the cast out, but on a subsequent bus cycle. The data access operation thus requires multiple operations, and bus cycles, to complete.

In other storage devices within the system, the data access operation and related cast out also require multiple directory accesses. Whether the storage devices is a vertically in-line device to which the data access and cast out operations are directed, or a horizontal storage device snooping the data access and cast out operations, separate directory lookups and the associated tag comparisons must be performed for these discrete operations.

It would be desirable, therefore, to reduce the number of directory accesses associated with data access operations requiring a victim cast out. It would further be advantageous to improve latency associated with responses to data access operations requiring a cast out.

SUMMARY OF THE INVENTION

It is therefore one object of the present invention to provide improved directory accesses necessary for data access operations in data processing systems.

It is another object of the present invention to provide improved directory lookups and tag comparisons for related data access and cast out operations.

It is yet another object of the present invention to provide concurrent directory lookups and tag comparisons for related data access and cast out operations to improve storage device performance and response latency.

The foregoing objects are achieved as is now described. In response to receiving a combined address for related data access and cast out operations, including an index identifying a congruence class containing both the target of the data access and the victim of the cast out, a single directory access is performed utilizing the index to locate the congruence class. Address tags within the congruence class are then compared to the address tag for the data access operation and the address tag for the cast out operation concurrently, generating separate hit signals as appropriate. Only a single directory access is required, however, rather than two separate directory accesses as required in the known art, taking advantage of the fact that both the data access target and the cast out victim belong to a single congruence class. Response latency is also improved, as is address bus bandwidth utilization.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
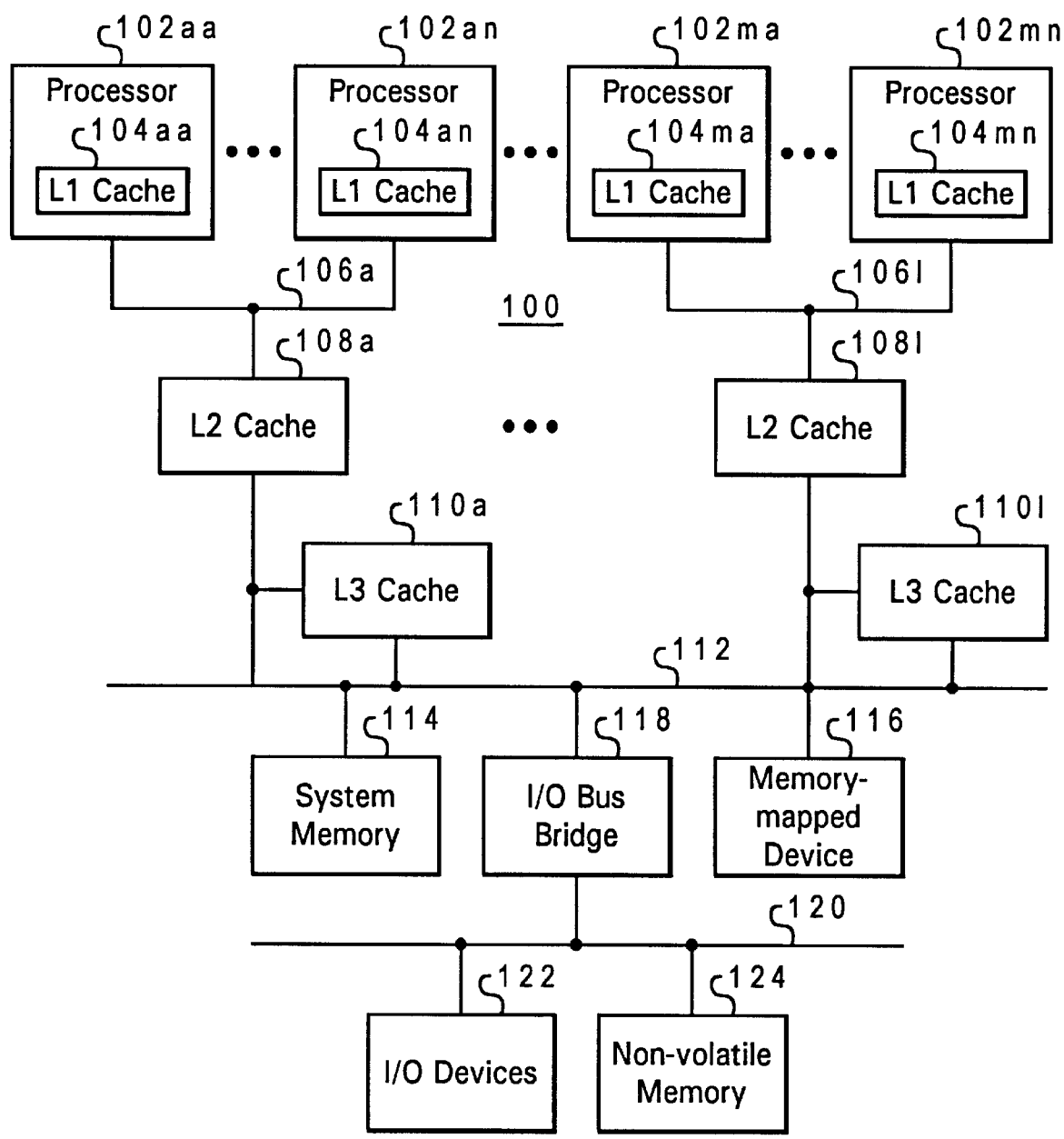
FIG. 1 depicts a block diagram of a data processing system in which a preferred embodiment of the present invention may be implemented.

With reference now to the figures, and in particular with reference to FIG. 1, a block diagram of a data processing system in which a preferred embodiment of the present invention may be implemented is depicted. Data processing system 100 is a symmetric multiprocessor (SMP) system including a plurality of processors 102aa through 102an and 102ma through 102mn (where "m" and "n" are integers). Each processor 102aa–102mn includes a respective level one (L1) cache 104aa–104mn, preferably on chip with the processor and bifurcated into separate instruction and data caches. Each processor 102aa–102mn is coupled via a processor bus 106aa–106l to a level two cache 108a–108l (where "l" is an integer), which are in-line caches shared by multiple processors in the exemplary embodiment.

Although in the exemplary embodiment only two processors are depicted as sharing each L2 cache, and only two L2 caches are depicted, those skilled in the art will appreciate that additional processors L2 caches may be utilized in a multiprocessor data processing system in accordance with the present invention. For example, each L2 cache may be shared by four processors, and a total of sixteen L2 caches may be provided.

Each L2 cache 108a–108l is connected to a level three (L3) cache 110a–110l and to system bus 112. L3 caches 110a–110l are actually in-line caches rather than lookaside caches as FIG. 1 suggests, but operations received from a vertical L2 cache (e.g., L2 cache 108a) are initiated both within the L3 cache 110a and on system bus 112 concurrently to reduce latency. If the operation produces a cache hit within the L3 cache 110a, the operation is cancelled or aborted on system bus 112. On the other hand, if the operation produces a cache miss within the L3 cache 110a, the operation is allowed to proceed on system bus 112.

The lower cache levels—L2 caches 108a–108l and L3 caches 110a–110l—are employed to stage data to the L1 caches 104a–104l and typically have progressively larger storage capacities but longer access latencies. L2 caches 108a–108l and L3 caches 110a–110l thus serve as intermediate storage between processors 102a–102l and system memory 114, which typically has a much larger storage capacity but may have an access latency many times that of L3 caches 110a–110l. Both the number of levels in the cache hierarchy and the cache hierarchy configuration (i.e, shared versus private, in-line versus lookaside) employed in data processing system 100 may vary.

L2 caches 108a–108l and L3 caches 110a–110l are connected to system memory 114 via system bus 112. Also connected to system bus 112 may be a memory mapped device 116, such as a graphics adapter providing a connection for a display (not shown), and input/output (I/O) bus bridge 118. I/O bus bridge 118 couples system bus 112 to I/O bus 120, which may provide connections for I/O devices 122, such as a keyboard and mouse, and nonvolatile storage 124, such as a hard disk drive. System bus 112, I/O bus bridge 118, and I/O bus 120 thus form an interconnect coupling the attached devices, for which alternative implementations are known in the art.

Non-volatile storage 124 stores an operating system and other software controlling operation of system 100, which are loaded into system memory 114 in response to system 100 being powered on. Those skilled in the art will recognize that data processing system 100 may include many additional components not shown in FIG. 1, such as serial and parallel ports, connections to networks or attached devices, a memory controller regulating access to system memory 114, etc. Such modifications and variations are within the spirit and scope of the present invention.

Figure 2A:
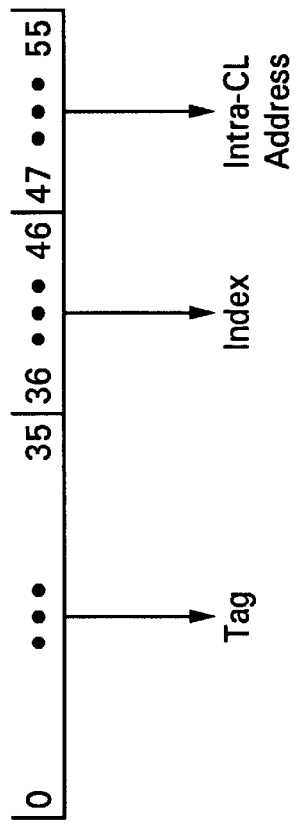
FIGS. 2A–2B are an addressing scheme and a combined address for related data access and cast out operations for transmission in accordance with a preferred embodiment of the present invention.
Figure 2B:

Referring to FIGS. 2A and 2B, an addressing scheme and a combined address for related data access and cast out operations for transmission in accordance with a preferred embodiment of the present invention are illustrated. In the exemplary embodiment, the combined address is transmitted on system bus 112 by an L2 cache 108a–108l in response to a cache miss for a data access operation within the L2 cache. However, the combined address may be employed for transmission on any bus by any storage device initiating related data access and cast out operations. Similarly, the data access operation is a READ in the exemplary embodiment, but may be any data access operation (e.g., WRITE, etc.).

When a cache miss occurs within the L2 cache for a data access operation, the cache controller for the L2 cache should be able to determine whether a cast out will be required to preserve data within the cache location selected to be updated by the replacement policy. Moreover, an indexed cache organization is employed for caches within the preferred embodiment. Cache lines are stored within the cache in congruence classes, sets of cache lines identified by a common index field within the system addresses for the cache lines in a congruence class.

An exemplary addressing scheme for data processing system 100 is shown in FIG. 2A. In the example shown, bits 0 . . . 35 of a 56 bit cache line address are the tag, bits 36 . . . 46 are the index, and the remaining bits are an intracache line address. The index field of the address is employed by the cache directory and the cache memory to locate congruence classes. Cache directory stores tags for cache lines-contained within cache memory within the congruence class identified by the index, and compares the tag of a target address to the tags within the congruence class. If a match is identified, the corresponding cache line within cache memory is the target data.

In the prior art, the address for a data access operation and the address for a related cast out are transmitted in separate system bus operations. However, within an indexed cache organization of the type described, the target data of a data access operation and the victim selected by the replacement policy are members of the same congruence class. Therefore the index field will be identical for both the data access and the cast out. In the present invention, the index for the congruence class containing the target cache lines for both the data access and the cast out ("Index") is combined with the tags for the cache line targeted by the data access ("Tag RD") and the cache line targeted by the cast out ("Tag CO"). The directory state ("CO State") of the cast out victim cache line—i.e., coherency state and/or LRU state—may also be appended to the address.

The combined address of the present invention may be employed whenever the need to preserve some unique aspect of data arises. Under the basic MESI coherency protocol, which includes the modified (M), exclusive (E), shared (S), and invalid (I) coherency states, a modified cache segment should be written to lower level storage when selected to be replaced. The modified state indicates that cache data has been modified with respect to corresponding data in system memory without also modifying the system memory data, such that the only valid copy of the data is within the cache entry storing the modified cache line or segment.

For exclusive, shared, or invalid cache segments, the cache segemented selected for replacement need not be written to lower level storage since either (1) a valid copy already exists elsewhere in storage, or (2) the contents of the cache segment are invalid. The exclusive state indicates that the cache entry is consistent with system memory but is only found, within all caches at that level of the storage hierarchy, in the subject cache. The shared state indicates that the cache entry may be found in the subject cache and at least one other cache at the same level in the storage hierarchy, with all copies of the data being consistent with the corresponding data in system memory Finally, the invalid state indicates that a cache entry—both the data and the address tag—within a given cache entry is no longer coherent with either system memory or other caches in the storage hierarchy.

Coherency states implemented as extensions to the basic MESI protocol may also require a cast out, or elect to perform a cast out, and therefore benefit from the present invention. For example, the recent (R) state, essentially a variant of the shared state, indicates that the cache entry may be found in both the subject cache and at least one other cache at the same level in the storage hierarchy, and that all copies of the data in the subject cache and other caches are consistent with the corresponding data in system memory, but also indicates that the subject cache, of all caches containing the shared data, most recently received the data in a system bus transaction such as a read from system memory. While a cast out is not necessary to preserve data integrity in such a case, a cast out operation may be useful to accurately maintain the recent state, and the combined address bus transaction of the present invention may be utilized for that purpose.

The combined address of the present invention will save bus cycles over the dual operation scheme of the known art. If each index or tag requires a full bus cycle to completely transmit, the combined address of the present invention may be transmitted in three bus cycles (neglecting the optional state information), rather than four bus cycles as would be required for separate data access and cast out operations. The additional bus cycle is saved because the index field need only be transmitted once for both operations.

The resulting system bus transaction condenses, within a single address, the information required for both the data access operation and the related cast out. The combined index and tags may be transmitted in any predefined order, and may be transmitted on a single bus cycle as shown in FIG. 2B or over multiple consecutive bus cycles. If the combined address is transmitted over multiple bus cycles, the index should be transmitted first to allow the receiving devices to begin a directory lookup at the earliest possible time. The tags may be transmitted during subsequent cycles and still be timely for the comparators employed to compared directory tags to the target tag(s). See commonly assigned, copending U.S. patent application Ser. No. 09/345, 302 entitled "CACHE INDEX BASED SYSTEM ADDRESS BUS," incorporated herein by reference.

Figure 3A:
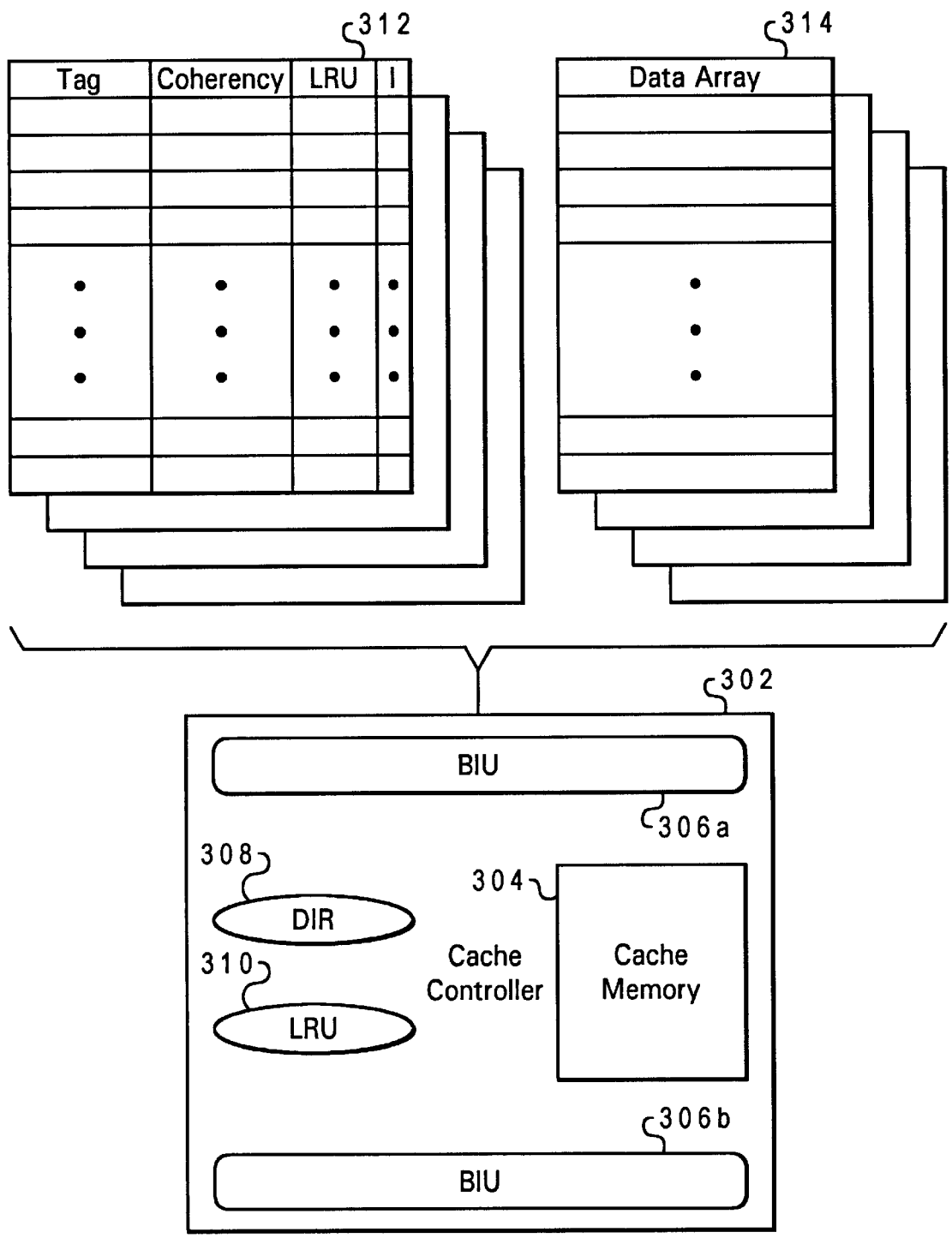
FIGS. 3A–3C depict diagrams of a cache and related cache control logic for utilizing the combined address for related data access and cast out operations to improve directory accesses in accordance with a preferred embodiment of the present invention.
Figure 3B:
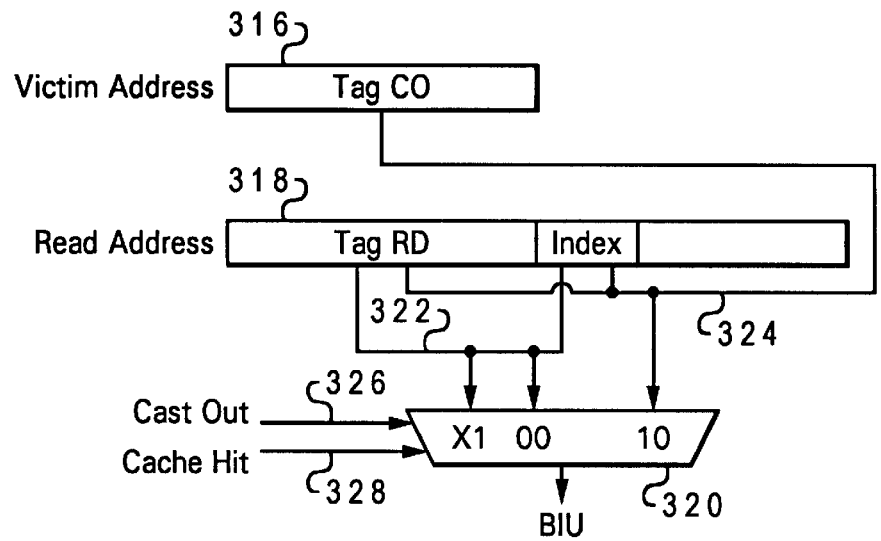
Figure 3C:
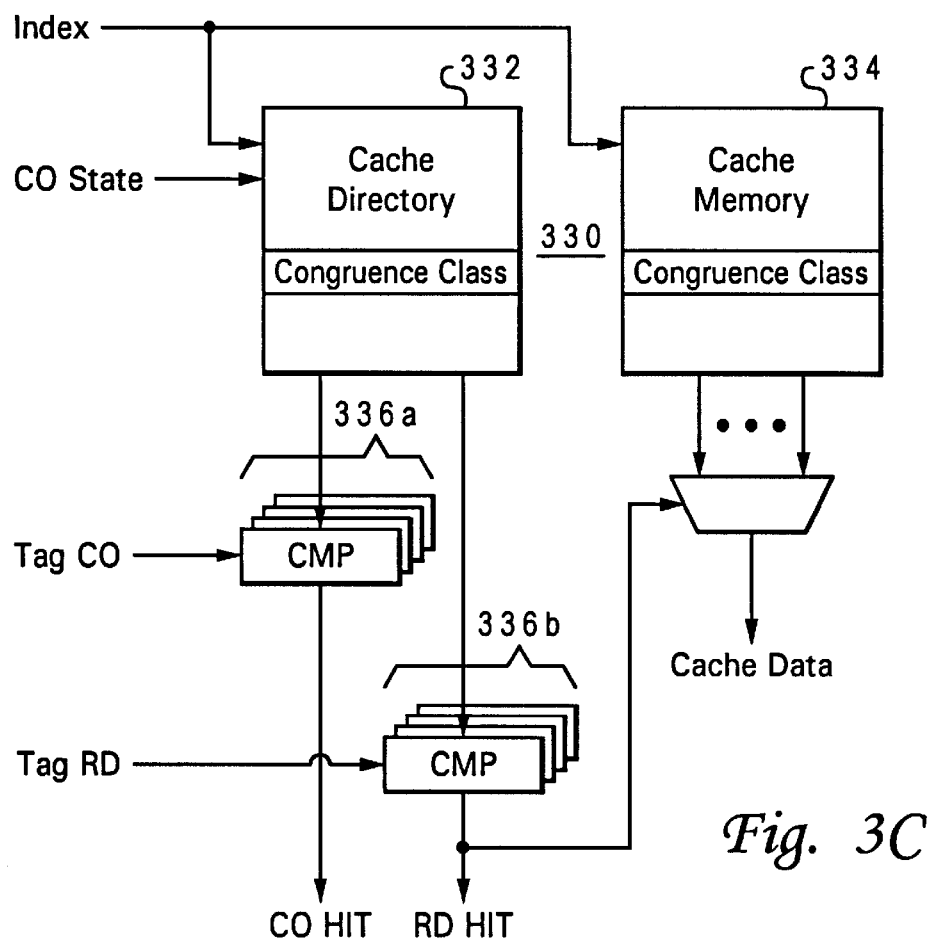

With reference now to FIGS. 3A through 3C, diagrams of a cache and related cache control logic for formulating, transmitting and utilizing the combined address for related data access and cast out operations in accordance with a preferred embodiment of the present invention is depicted. The elements depicted are employed in L2 caches 108a–108n and in L3 caches 110a–110n. A cache controller 302 receives and transmits operations relating to data within cache memory 304 from upstream and downstream buses through bus interface units ("BIU") 306a and 306b. A directory lookup 308 is employed to locate cache lines within cache memory 304 and an LRU unit 310 implements the replacement policy for updating cache lines within cache memory 304.

The logical organization of data within the cache is in tables containing cache directory entries 312 and a corresponding data array 314. The cache directory entries 312 contain the address tag for the corresponding cache lines within data array 314, as well as the coherency state, the LRU status, and an inclusivity ("I") state for the respective cache line. The coherency state indicates the cache line consistency with other copies of the cache line in other storage devices within the system. The LRU status indicates the LRU position for the cache line within a congruence class. The inclusivity state indicates whether the cache line is stored within a logically in-line, higher level cache.

When a data access operation is received from a processor or higher level storage device, cache controller 302 may trigger the LRU 310 to select a victim, then look up the selected victim to determine if a cast out would be required to update the corresponding cache line and, if so, retrieve the tag for the current contents of the potential victim. This may be performed concurrently with the directory lookup and tag comparison employed to determine whether the received data access operation generates a cache hit or miss.

FIG. 3B depicts a detail of the portion of a cache employed to formulate and transmit a combined address for related data access and cast out operations. When a data access operation is received, the identity and address tag 316 for the potential victim are determined from the replacement policy (LRU) and cache directory. The index field and address tag 318 for the data access operation are supplied within the operation.

A multiplexer 320 receives, as one input 322, the index field and address tag 318 for the data access operation. As the other input 324, multiplexer 320 receives the index field and address tag 318 combined with the address tag 316 for the potential cast out. Multiplexer 320 is controlled by a cast out signal 326 indicating whether a cast out may be required for the data access operation. This may be determined by examining the coherency state of the potential victim and whether the current access was a miss. If the potential victim does not contain valid and unique data (e.g., the coherency state is "shared" or "invalid"), the cast out signal 326 is not asserted. If the potential victim contains unique and valid data (e.g., the coherency state is "modified"), case out signal 326 is asserted.

Multiplexer 320 is also controlled by a cache hit signal 328, taken from the end of the directory lookup and tag comparison functions within the cache and asserted if the cache contains the target data for the received data access operation. If cache hit signal 328 is asserted, the first input 322 is passed to the bus interface unit regardless of whether the cast out signal 326 was asserted. If a cache hit occurs, the target data is within the cache and no need to select a victim exists. Furthermore, no need exists to transmit the address for the data access operation to lower level storage devices, except perhaps to allow the lower level storage devices to update their coherency state and/or LRU information relating to the target cache line.

If neither the cast out signal 326 nor the cache hit signal 328 are asserted, the first input 322 is similarly passed to the bus interface unit. In this circumstance, no need to perform a cast out exists (e.g., the victim was "invalid"). The address for the data access operation will be transmitted to the lower storage levels, however, and the cast out tag may optionally be transmitted with the index and tag for the data access operation to allow lower level devices to update status information (e.g., "recent" version of shared coherency state or LRU position). Otherwise, the second input 324 is passed to the bus interface unit only when the cache hit signal 328 is not asserted (i.e., cache miss) and the cast out signal 326 is asserted. In this case, both the address tag for the data access and the cast out tag will be transmitted with multiplexer 320 to allow a lower level cache a chance to process both operations.

FIG. 3C depicts a detail of the portion of a cache employed to utilize a combined address for related data access and cast out operations to improve directory access performance and response latency. A lower level cache device 330 receiving the combined address of the present invention routes the index field ("Index") to the cache directory 332 and the cache memory 334 to perform a lookup of the congruence class identified by the index. The lower level cache thus requires only one directory access for the combined address, rather than the two separate directory accesses required by the discrete data access and cast out operations of the known art.

The data access and cast out tags ("Tag RD" and "Tag CO," respectively) are routed to separate sets of comparators 336a and 336b for concurrent comparison to the address tags within the congruence class identified by the index. Separate signals ("CO HIT" and "RD HIT") are generated for matches of the cast out tag and the data access tag with tags within the indexed congruence class. The RD HIT signal may be employed to select corresponding data within the cache memory 334 for the data access operation. The CO HIT signal may be utilized to update the status of cache directory 332 or to trigger some other function. If the target of the data access operation is contained within cache memory 334, the cache line may be sourced to the higher level cache initiating the combined data access and cast out operation, where the cache line is stored in the location previously occupied by the victim of the cast out operation.

Figure 4:
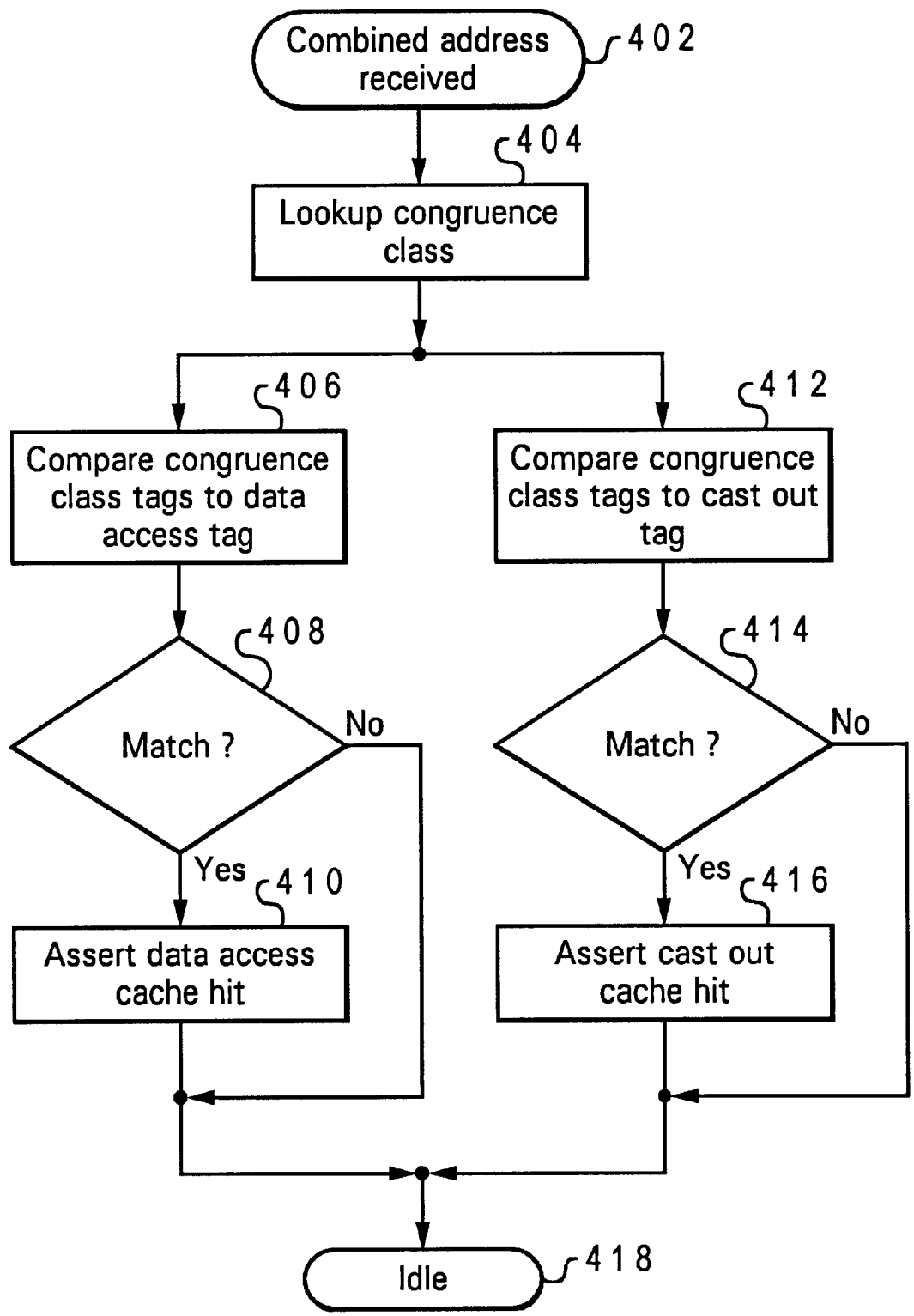
FIG. 4 is a high level flow chart for a process of utilizing the combined address for related data access and cast out operations to improve directory accesses in accordance with a preferred embodiment of the present invention.

Referring to FIG. 4, a high level flow chart for a process of utilizing the combined address for related data access and cast out operations to improve directory accesses in accordance with a preferred embodiment of the present invention is illustrated. The process begins at step 402, which depicts receiving a combined data access and cast out operation address, including the index field identifying the congruence class containing both the data access target and the cast out victim as well as the address tags for the data access target and the cast out victim.

The process then passes to step 404, which illustrates looking up the congruence class corresponding to the index received within the combined address. The process next passes to step 406, which depicts comparing the address tags within the identified congruence class to the address tag for the data access operation, and then to step 408, which illustrates a determination of whether a match was determined. If so, the process proceeds to step 410, which depicts asserting the data access cache hit signal.

From step 404, the process also passes, in parallel, to step 412, which depicts comparing the address tags within the identified congruence class to the address tag for the cast out operation, and then to step 414, which illustrates a determination of whether a match was determined. If so, the process proceeds to step 416, which depicts asserting the cast out cache hit signal. Thus, only a single directory lookup for the congruence class identified by the index received within the combined address is required. From either or both of steps 410 and/or 416, the process passes to step 418, which illustrates the process becoming idle until another combined data access and cast out operation address is received.

Figure 5A:
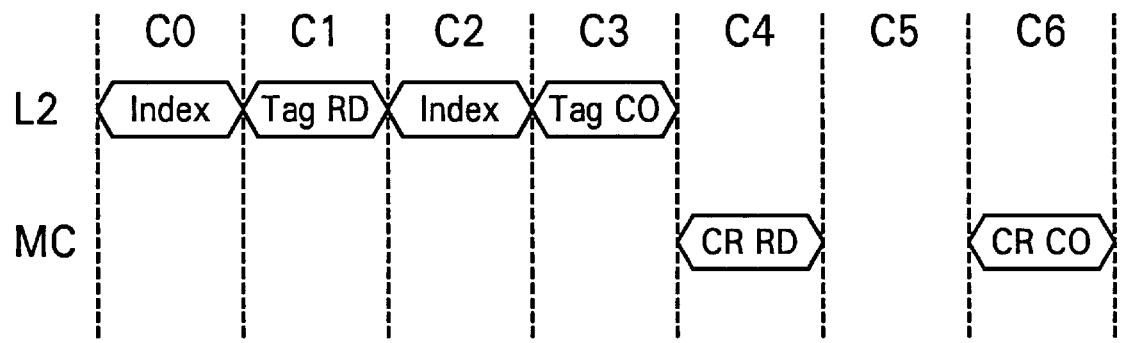
FIGS. 5A–5B depict timing diagrams for data access and cast out operations in accordance with the known art and for a combined data access and cast out operation in accordance with a preferred embodiment of the present invention.
Figure 5B:
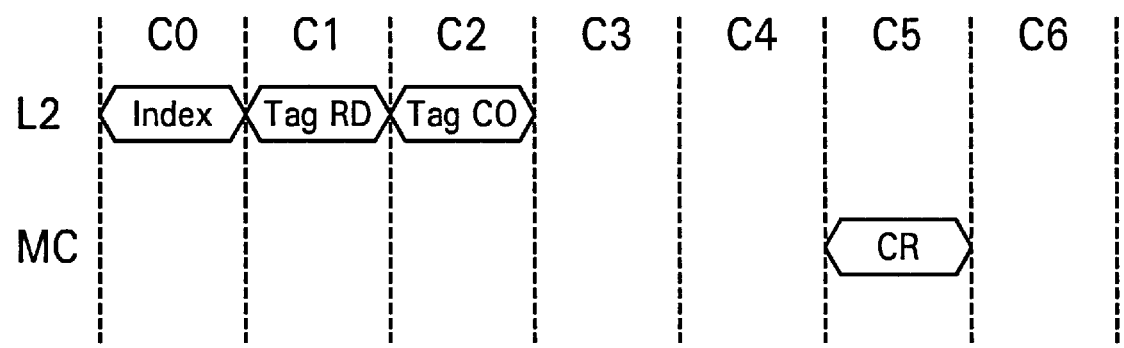

With reference to FIGS. 5A and 5B, timing diagrams for data access and cast out operations in accordance with the known art and for a combined data access and cast out operation in accordance with a preferred embodiment of the present invention are depicted. FIG. 5A depicts a timing diagram for data access and cast out operations in accordance with the known art. The data access operation is initiated by transmitting the index and tag for the target on the address bus by the storage device ("L2") requiring the target data. The index and tag are presumed to require separate bus cycles for transmission in the example shown.

In the example depicts, a response window of two bus cycles is presumed. During those two bus cycles, the index and tag for the related cast out operation may be transmitted. The combined response to the data access operation ("CR RD") is then driven by the system bus response logic within the memory controller (MC). Two bus cycles later, the combined response to the cast out operation ("CR CO") is driven. The data access operation cannot be successfully completed until this response is received.

FIG. 5B depicts the combined data access and cast out operation of the present invention. The combined address is driven by the storage device (L2) initiating the combined operation, and takes fewer cycles. The combined response—to both the data access and the cast out operation—is driven two bus cycles after transmission of the address is complete. In the example shown, the combined response is received one bus cycle sooner with the present invention than with the known art, and the complete operation requires fewer bus cycles (4 bus cycles used over a 6 cycle period) than the known art (6 bus cycles used over a 7 cycle period).

The present invention reduces the number of directory accesses required to perform related data access and cast out operations initiated by a higher level storage device. Latency is also improved over conventional systems, which require separate data access and cast out operations each having their own response period. In the present invention, a single response period suffices for both the data access and cast out operations. Address bus bandwidth utilization is also improved since fewer address bus cycles are consumed for the combined operation than for separate operations.

While the invention has been particularly shown and described with reference to a preferred embodiment, it will be understood by those skilled in the art that various changes in form and detail may be made therein without departing from the spirit and scope of the invention.

What is claimed is:

1. A method of accessing data, comprising:
   receiving a combined address including an address tag for a data access operation, an address tag for a cast out operation related to the data access operation, and an address index for both the data access operation and the cast out operation;
   identifying a congruence class corresponding to the address index that includes both a target of the data access operation and a victim of the cast out operation; and
   comparing address tags within the congruence class to the address tag for the data access operation and to the address tag for the cast out operation.

2. The method of claim 1, wherein the step of receiving a combined address including an address index for a data access operation, an address tag for the data access operation, and an address tag for a cast out operation related to the data access operation further comprises:
   receiving the address index in a first bus cycle and the address tags for the data access and cast out operations in subsequent bus cycles following the first bus cycle.

3. The method of claim 1, wherein the step of receiving a combined address including an address index for a data access operation, an address tag for the data access operation, and an address tag for a cast out operation related to the data access operation further comprises:
   receiving directory state information for a victim of the cast out operation.

4. The method of claim 1, wherein the step of identifying a congruence class corresponding to the address index further comprises:
   performing a single directory access for both the data access operation and the cast out operation.

5. The method of claim 1, wherein the step of comparing address tags within the congruence class to the address tag for the data access operation and to the address tag for the cast out operation further comprises:
   concurrently comparing address tags within the congruence class to the address tag for the data access operation and to the address tag for the cast out operation.

6. A method of accessing data, comprising:
   receiving a combined address for a data access operation and a cast out operation related to the data access operation;
   accessing a directory a single time utilizing the combined address; and
   in response to accessing said directory said single time, responding to the data access operation based on contents of the directory and updating a status of an entry within the directory based on the cast out operation.

7. The method of claim 6, wherein the step of receiving a combined address for a data access operation and a cast out operation related to the data access operation further comprises:
   receiving an index identifying a congruence class including both a target of the data access operation and a victim of the cast out operation.

8. The method of claim 6, further comprising:
   concurrently comparing a target address tag and a victim address tag within the combined address to address tags within a congruence class identified by an index within the combined address to determine whether a target for the data access operation and a victim for the cast out operation are contained within a memory for a storage device receiving the combined address.

9. A system for accessing data, comprising:
   a bus; and
   a storage device coupled to the bus, the storage device receiving a combined address including an address tag for a data access operation, an address tag for a cast out operation related to the data access operation on the bus, and an address index for both the data access operation and the cast out operation,
      wherein the storage device, responsive to receiving the combined address on the bus, identifies a congruence class corresponding to the address index that includes both a target of the data access and a victim of the cast out operation, and compares address tags within the congruence class to the address tag for the data access operation and to the address tag for the cast out operation.

10. The system of claim 9, wherein the storage device receives the address index within the combined address in a first bus cycle and the address tags for the data access and cast out operations in subsequent bus cycles following the first bus cycle.

11. The system of claim 9, wherein the storage device receives directory state information for a victim of the cast out operation with the combined address.

12. The system of claim 9, wherein the storage device performs a single directory access for both the data access operation and the cast out operation.

13. The system of claim 9, wherein the storage device concurrently compares address tags within the congruence class to the address tag for the data access operation and to the address tag for the cast out operation.

14. A system for accessing data, comprising:
   a bus;
   a storage device coupled to the bus, the storage device:
      receiving a combined address for a data access operation and a cast out operation related to the data access operation;
      accessing a directory within the storage device a single time utilizing the combined address; and in response to said single access, responding to the data access operation based on contents of the directory and updating a status of an entry within the directory based on the cast out operation.

15. The system of claim 14, wherein the storage device receives, within the combined address, an index identifying a congruence class including both a target of the data access operation and a victim of the cast out operation.

16. The system of claim 14, wherein the storage device concurrently compares a target address tag and a victim address tag within the combined address to address tags within a congruence class identified by an index within the combined address to determine whether a target for the data access operation and a victim for the cast out operation are contained within a memory for a storage device receiving the combined address.

17. The system of claim 14, further comprising:
- a second storage device coupled to the bus and transmitting the combined address;
- a plurality of processors initiating data access operations including the data access operation corresponding to the combined address; and
- a system memory containing data targeted by the data access operation corresponding to the combined address.

* * * * *

UNITED STATES PATENT AND TRADEMARK OFFICE
CERTIFICATE OF CORRECTION

PATENT NO. : 6,343,344 B1
DATED : January 29, 2002
INVENTOR(S) : Arimilli et al.

It is certified that error appears in the above-identified patent and that said Letters Patent is hereby corrected as shown below:

<u>Column 1,</u>
Lines 9-11, delete the title "MULTIPROCESSOR SYSTEM BUS WITH READ/ CASTOUT (RCO) ADDRESS TRANSACTION" and replace it with
-- SYSTEM BUS TRANSACTION WITH CACHE TAG OF VICTIM ADDRESS --.

Lines 13-14, delete the words "READ/DEALLOCATED (RDA) ADDRESS TRANSACTION" and replace them with the words -- CACHE TAG OF VICTIM ADDRESS --.

Lines 14-17, delete the words "MULTIPROCESSOR SYSTEM BUS WITH CACHE STATE AND LRU SNOOP RESPONSES FOR READ/CASTOUT (RCO) ADDRESS TRANSACTION" and replace them with the words -- SMP SYSTEM BUS WITH SNOOP RESPONSES FOR VICTIM ADDRESS --.

Lines 18-20, delete the words "UPGRADING OF SNOOPER CACHE STATE CASTOUT (RCO) ADDRESS TRANSACTIONS" and replace them with the words -- UPGRADING OF SNOOPER CACHE STATE MECHANISM FOR SYSTEM BUS WITH READ/CASTOUT (RCO) ADDRESS TRANSACTIONS --.

Lines 22-23, delete the words "MULTIPROCESSOR SYSTEM BUS WITH COMBINED SNOOP RESPONSES IMPLICITLY UPDATED SNOOPER LRU POSITION" and replace them with the words -- SMP SYSTEM BUS WITH SNOOP RESPONSES CONTAINING LRU INFORMATION --.

Lines 24-27, delete the words "MULTIPROCESSOR SYSTEM BUS WITH SYSTEM CONTROLLER EXPLICITLY UPDATING SNOOPER CACHE STATE INFORMATION" and replace them with the words -- SMP SYSTEM BUS WITH COMBINED SNOOP RESPONSES EXPLICITLY UPGRADING SNOOPER LRU INFORMATION --.

Lines 27-29, delete the words "MULTIPROCESSOR SYSTEM BUS WITH SYSTEM CONTROLLER EXPLICITLY UPDATING SNOOPER LRU INFORMATION" and replace them with the words -- SMP SYSTEM BUS WITH COMBINED SNOOP RESPONSES EXPLICITLY UPGRADING SNOOPER LRU INFORMATION --.

UNITED STATES PATENT AND TRADEMARK OFFICE
CERTIFICATE OF CORRECTION

PATENT NO. : 6,343,344 B1
DATED : January 29, 2002
INVENTOR(S) : Arimilli et al.

It is certified that error appears in the above-identified patent and that said Letters Patent is hereby corrected as shown below:

Lines 30-33, delete the words "MULTIPROCESSOR SYSTEM BUS WITH COMBINED SNOOP RESPONSES EXPLICITLY CANCELLING MASTER VICTIM SYSTEM BUS TRANSACTION" and replace them with the words -- SMP SYSTEM BUS WITH COMBINED SNOOP RESPONSES EXPLICITLY CANCELLING MASTER VICTIM SYSTEM BUS TRANSACTION --.

Lines 33-36, delete the words "MULTIPROCESSOR SYSTEM BUS WITH COMBINED SNOOP RESPONSES EXPLICITLY CANCELLING MASTER ALLOCATION OF READ DATA" and replace them with the words -- SMP SYSTEM BUS WITH COMBINED SNOOP RESPONSES EXPLICITLY CANCELLING MASTER ALLOCATION OF LOAD DATA --.

Lines 37-39, delete the words "MULTIPROCESSOR SYSTEM BUS WITH COMBINED SNOOP RESPONSES EXPLICITLY INFORMING SNOOPERS TO SCARF DATA" and replace them with the words -- SMP SYSTEM BUS WITH COMBINED SNOOP RESPONSES EXPLICITLY INFORMING SNOOPERS TO SCARF MODIFIED DATA --.

Signed and Sealed this

Twelfth Day of November, 2002

*Attest:*

*Attesting Officer*

JAMES E. ROGAN
*Director of the United States Patent and Trademark Office*